(12) United States Patent
Himuro et al.

(10) Patent No.: US 7,985,317 B2
(45) Date of Patent: Jul. 26, 2011

(54) JOINING STRUCTURE OF METAL WORKS

(75) Inventors: Katsuya Himuro, Hiroshima (JP);
Chikara Tanaka, Hiroshima (JP);
Masatoshi Shinomori, Hiroshima (JP)

(73) Assignee: Mazda Motor Corporation (JP)

(*) Notice: Subject to any disclaimer, the term of this patent is extended or adjusted under 35 U.S.C. 154(b) by 275 days.

(21) Appl. No.: 12/139,656

(22) Filed: Jun. 16, 2008

(65) Prior Publication Data
US 2008/0314515 A1 Dec. 25, 2008

(30) Foreign Application Priority Data

Jun. 20, 2007 (JP) .................................. 2007-162176

(51) Int. Cl.
*C09J 5/06* (2006.01)
(52) U.S. Cl. ..................... 156/307.5; 156/182; 156/290; 156/291; 156/292; 156/295; 156/306.6; 156/307.1; 156/307.7
(58) Field of Classification Search .................. 156/182, 156/290, 292, 295, 306.6, 291, 307.1, 307.7
See application file for complete search history.

(56) References Cited

U.S. PATENT DOCUMENTS

| | | | |
|---|---|---|---|
| 6,174,932 B1 * | 1/2001 | Pachl et al. | 522/100 |
| 6,599,954 B1 * | 7/2003 | Hayashi et al. | 522/25 |
| 2002/0020493 A1 * | 2/2002 | Ichihara | 156/308.8 |
| 2009/0272488 A1 * | 11/2009 | Ogasawara | 156/280 |

FOREIGN PATENT DOCUMENTS

| JP | 06055277 | | 1/1994 |
|---|---|---|---|
| JP | 2001191968 A | * | 7/2001 |

* cited by examiner

*Primary Examiner* — Khanh Nguyen
*Assistant Examiner* — Margaret Squalls
(74) *Attorney, Agent, or Firm* — Studebaker & Brackett PC; Donald R. Studebaker

(57) ABSTRACT

There are provided an adhesive-agent disposing step of disposing the adhesive agent, a first curing step of curing part of the adhesive agent disposed (including an adhesive-agent-disposition providing step of the present invention), a painting step of coating a paint on the works, and a heating step (a second curing step) of applying a heating treatment with a drying device. There can be provided a joining method of works that can ensure a high joining quality and productivity.

7 Claims, 10 Drawing Sheets

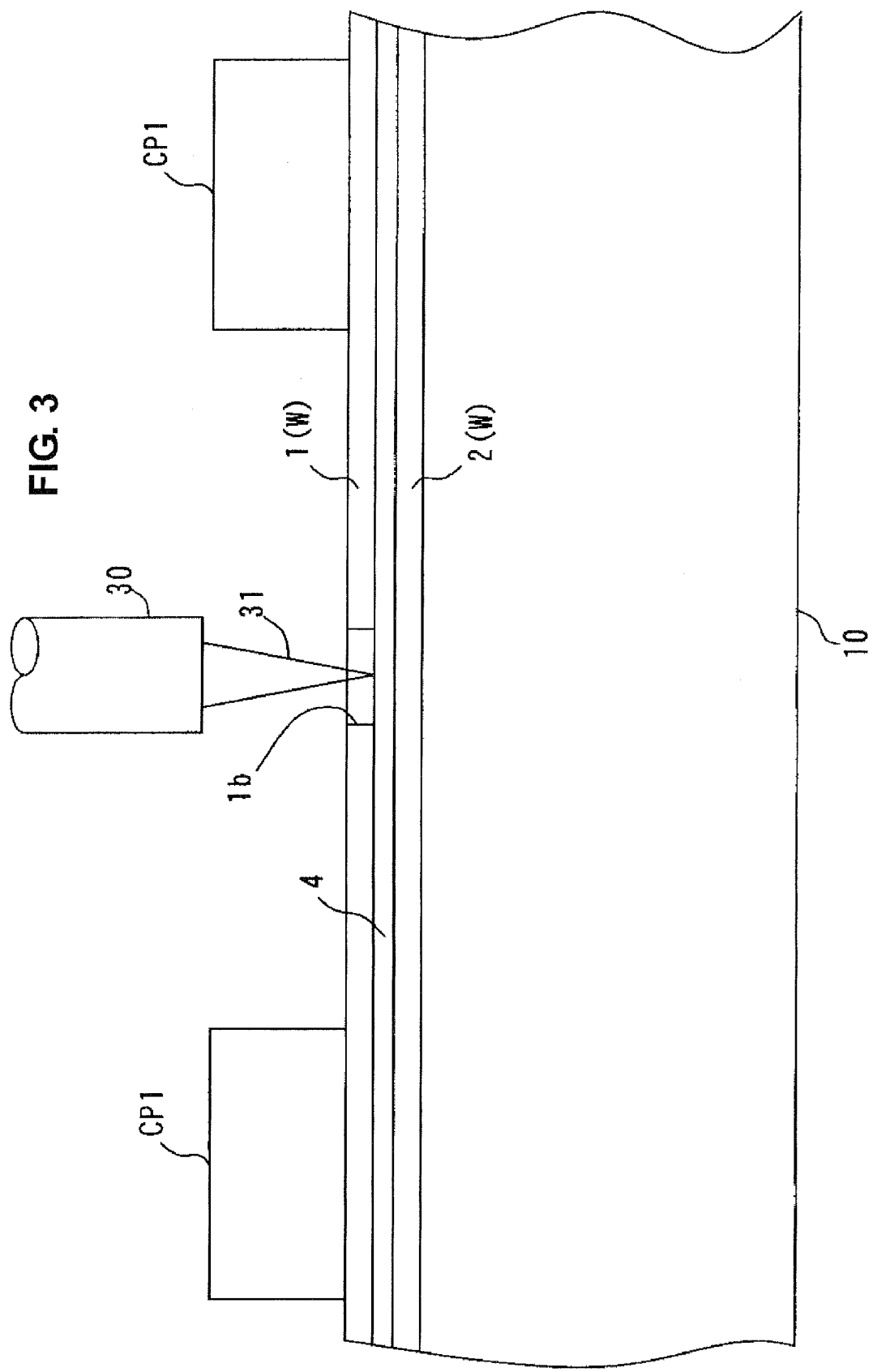

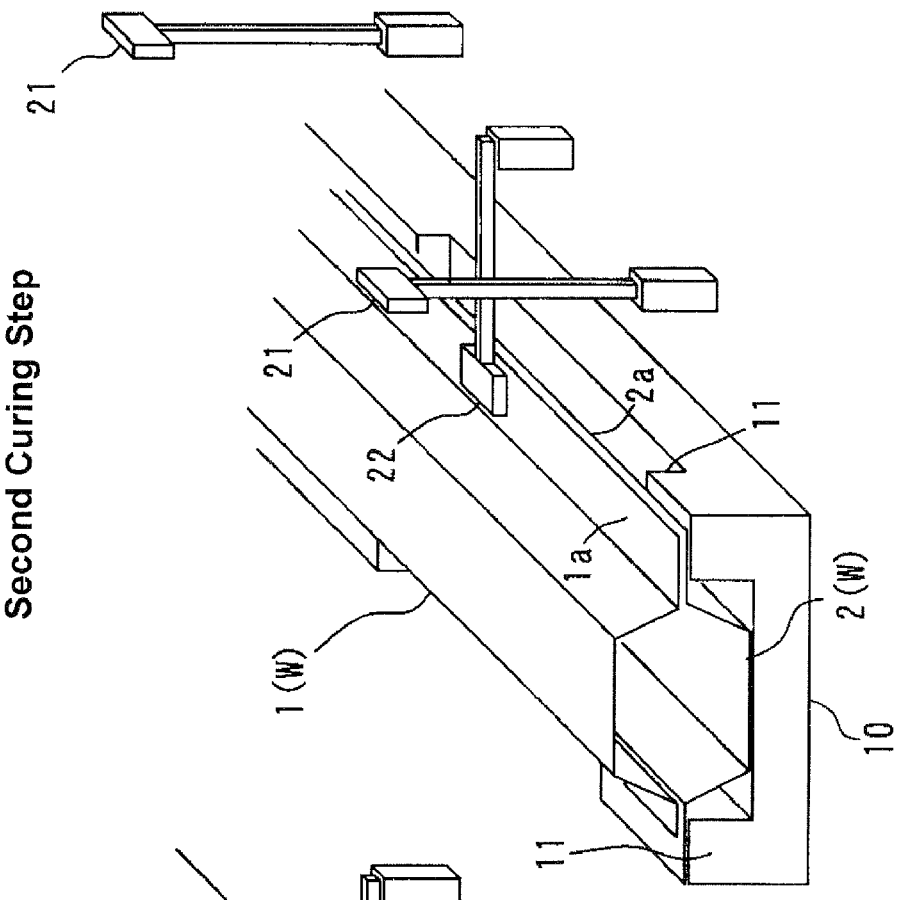
FIG. 5A First Curing Step
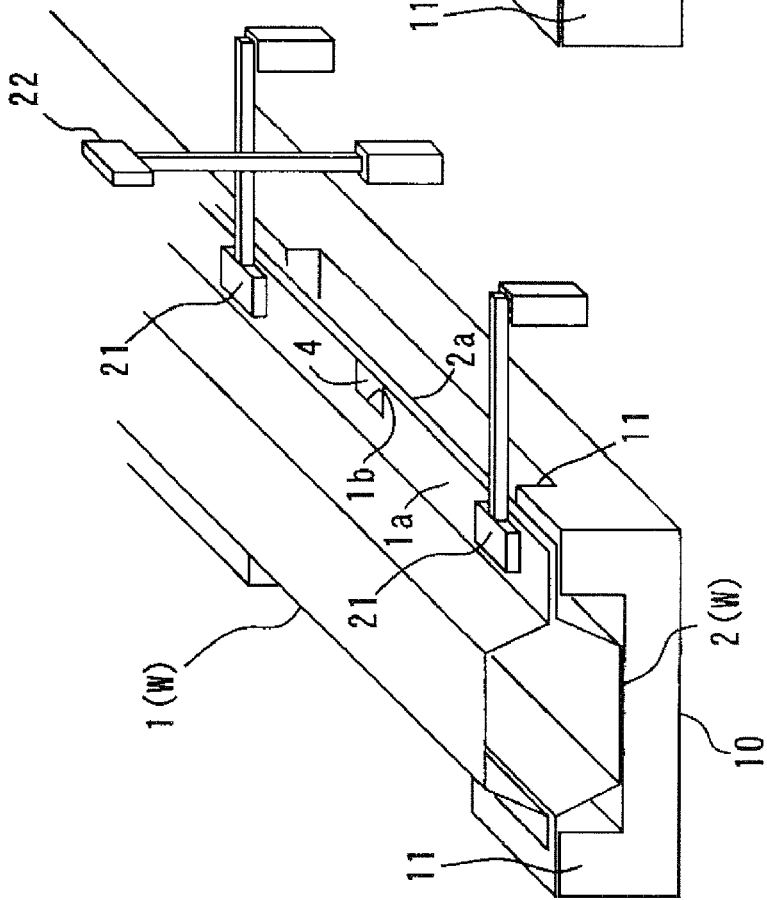
FIG. 5B Second Curing Step

▨ Part of Adhesive Agent that has not been cured yet

▩ Part of Adhesive Agent that has been cured

▨ Part of Adhesive Agent that has not been cured yet

▩ Part of Adhesive Agent that has been cured

First Curing Step

Second Curing Step

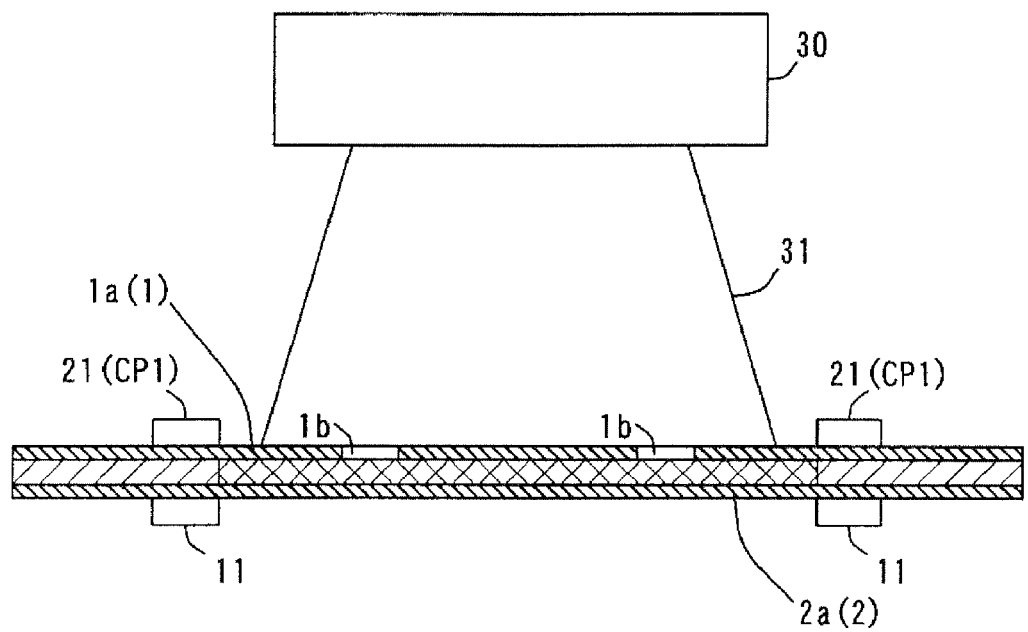
FIG. 8
 Part of Adhesive Agent that has not been cured yet
 Part of Adhesive Agent that has been cured

JOINING STRUCTURE OF METAL WORKS

BACKGROUND OF THE INVENTION

The present invention relates to a joining method of works, and relates to a joining method of joining a panel to a vehicle body of a vehicle, for example.

For example, a welding technology, such as spot welding or laser welding, or a joining method using an adhesive agent have been used as joining means for joining metal plate members to make a vehicle body in an automobile manufacturing factory.

Japanese Patent Laid-Open Publication No. 6-55277, for example, discloses a weld-bond method using both the spot welding and the adhesive agent, which may further improve a joining using a single joining means. In this weld-bond method, a temporary joining is applied by the spot welding in a vehicle body assembling step (spot welding step), and then the adhesive agent is cured in a drying step (heating step) where the vehicle body passing through a painting step is dried in a paint-drying device (see a flowchart on the top in FIG. 1).

In the meantime, a quick-curing adhesive agent, such as ultraviolet-curing adhesive agent or an adhesive agent made from cyanoacrylate, is known. Further, an adhesive agent having a chain-reacting curing reaction function is also known recently, which is disclosed in U.S. Pat. No. 6,599,954. In this adhesive agent having the chain-reacting curing reaction function, when this adhesive agent is exposed to energy radiation, a heat energy of curing reaction is positively generated within the adhesive agent, and the curing reaction is further effected, like a chain reaction, by the heat energy of curing reaction to successively generate an additional heat energy of curing reaction, so that the adhesive agent can be cured by means of these reaction heat energies.

Herein, in the above-described weld bond method it may take some time for the adhesive agent to be cured, so some additional assist means for temporally fixing, such as spot welding, or fixing with rivets, would be necessary. However, this would cause further a problem in that such temporally-fixing means may need more time to move and set such apparatuses at their proper positions.

On the other hand, the above-described quick-curing adhesive agent would have a disadvantage in that a tack time until a portion that is not exposed to ultraviolet rays comes to be cured is too short. Meanwhile, the above-described adhesive agent having the chain-reacting curing reaction function may not have this advantage, and it may be important to ensure a stable, successive generation of the curing reaction heat for this kind of adhesive agent. For example, if the reaction heat was let go away to an outside portion with influence of a work clearance, a jig, and the like, there may occur a problem in that the curing-chain reaction of the adhesive agent would stop improperly. This improper stop could cause a lack of joining strength obtained, deformation of work with local curing shrinkages of adhesive agent, an improper opening of joining face, and the like.

SUMMARY OF THE INVENTION

The present invention has been devised in view of the above-described problems, and an object of the present invention is to provide a joining method of works that can ensure a high joining quality and productivity.

According to the present invention, there is provided a joining method of works, in which a pair of works is joined with an adhesive agent having a chain-reacting curing reaction function that is disposed at a joining face of the works, comprising an adhesive-agent-disposition providing step of providing a disposition of the adhesive agent in such a manner that part of the adhesive agent that is disposed at a first curing portion of the joining face and another part of the adhesive agent that is disposed at a second curing portion of the joining face that is located near the first curing portion are in thermal isolation so that a chain-reacting curing reaction of the part of the adhesive agent at the first curing portion can be restrained from transferring to the another part of the adhesive agent at the second curing portion, a first curing step of curing the part of the adhesive agent at the first curing portion by applying an energy for causing the chain-reacting curing reaction to the another part of the adhesive agent at the first curing portion, and a second curing step of curing the another part of the adhesive agent at the second curing portion, the second curing step being conducted after the first curing step.

According to the present invention, since there is provided the adhesive-agent-disposition providing step in which the chain-reacting curing reaction of the part of the adhesive agent at the first curing portion can be restrained from transferring to the another part of the adhesive agent at the second curing portion, the adhesive agent at the first curing portion can be cured stably and surely with the chain-reacting curing reaction caused by the energy applied in the first curing step. And, the adhesive agent at the second curing portion can be cured surely and properly through the succeeding second curing step. Accordingly, any improper lack of joining strength, deformation of work with local curing shrinkages of adhesive agent, opening of joining face, and the like can be properly prevented, thereby ensuring the properly high joining quality and productivity.

Herein, "a pair of works" in this description may comprise, not limited to two members, three or more members. The adhesive agent may be preferably disposed in a line shape. This line shape contains a straight-line shape, a curve-line shape, a circular-line shape, or the like. Further, the adhesive agent may be disposed in a face shape as well. Further, the adhesive agent may be disposed at plural portions in a dotty shape, in which part of the adhesive agent dotted is cured in the first curing step, and the rest of part is cured in the second curing step. Embodiments of "disposition of the adhesive agent" includes applying of a solid type of adhesive agent, applying or filling of a liquid type of adhesive agent, and the like.

According to an embodiment of the present invention, the adhesive-agent-disposition providing step comprises a step of letting a heat, which is generated by the chain-reacting curing reaction of the part of the adhesive agent at the first curing portion, go away to an outside portion, whereby the chain-reacting curing reaction of the part of the adhesive agent at the first curing portion can be restrained from transferring to the another part of the adhesive agent at the second curing portion. Thereby, the above-described function and advantage of the present invention can be achieved properly.

According to another embodiment of the present invention, the heat-letting-going-away step comprises a clamping step of clamping a specified portion of the work that is located at a terminal portion of the second curing portion with a clamp that has a thermal conductivity. Thereby, since the heat generated by the chain-reacting curing reaction of the part of the adhesive agent at the first curing portion is let go away smoothly to the outside portion at least via the clamp, the chain-reacting curing reaction can be restrained from transferring to the another part of the adhesive agent at the second curing portion. As a result, the adhesive agent at the second curing portion can remain properly in a state in which it has not been cured yet. Thus, the adhesive agent at the second curing portion can be cured surely and properly through the succeeding second curing step. Further, the above-described transferring restraint function of the chain-reacting curing reaction can be achieved easily by a very simple way of clamping the work with the clamp.

According to another embodiment of the present invention, the adhesive-agent-disposition providing step comprises a step of providing a gap, which has substantially no adhesive agent, between the part of the adhesive agent at the first curing portion and the another part of the adhesive agent at the second curing portion, whereby the chain-reacting curing reaction of the part of the adhesive agent at the first curing portion can be restrained from transferring to the another part of the adhesive agent at the second curing portion with the gap. Thereby, the above-described function and advantage of the present invention can be achieved properly and easily.

According to another embodiment of the present invention, the gap is provided by forming a projection portion at a specified portion of at least one of the works that forms the joining face, the projection portion being formed so as to project toward the other of the works in a forming step of the works. Thereby, the gap can be provided surely with the projection portion.

According to another embodiment of the present invention, the gap is provided by applying the adhesive agent to a specified portion of at least one of the works that forms the joining face in an adhesive-agent applying step in such a manner applying of the adhesive agent is stop temporally. Thereby, the gap can be provided in a simple way.

According to another embodiment of the present invention, the second curing step is executed by a heating step, in which the works are heated in a heater, after the first curing step. Thereby, the second curing step can be materialized easily, thereby easily and surely curing the adhesive agent remaining in the state in which it has not been cured yet.

According to another embodiment of the present invention, the second curing step is executed by a heating step, in which a paint coated on the works is dried, after a painting step. Thereby, since the second curing step is executed by the heating step, there may be no need to provide any additional step or facility for the second curing step, thereby further improving productivity.

According to another embodiment of the present invention, the painting step is an electrodeposition painting step.

According to another embodiment of the present invention, the works comprise a vehicle body of an automotive vehicle.

Other features, aspects, and advantages of the present invention will become apparent from the following description which refers to the accompanying drawings.

BRIEF DESCRIPTION OF THE DRAWINGS

FIG. 2A is an exploded diagram; FIG. 2B is an assembling diagram.

FIG. 3 is a side view of the works at clamping according to the first embodiment.

FIGS. 5A, 5B are perspective views showing manners of a clamping step of the works according to the first embodiment, FIG. 5A shows the manner in a first curing step; FIG. 5B shows the manner in a second curing step.

FIG. 6A shows a manner in the first curing step; FIG. 6B shows a manner in the second curing step.

FIG. 7A shows the manner in a first curing step; FIG. 7B shows the manner in a second curing step.

FIG. 8 is an explanatory diagram showing a manner of applying ultraviolet rays.

DETAILED DESCRIPTION OF THE INVENTION

Figure 1:
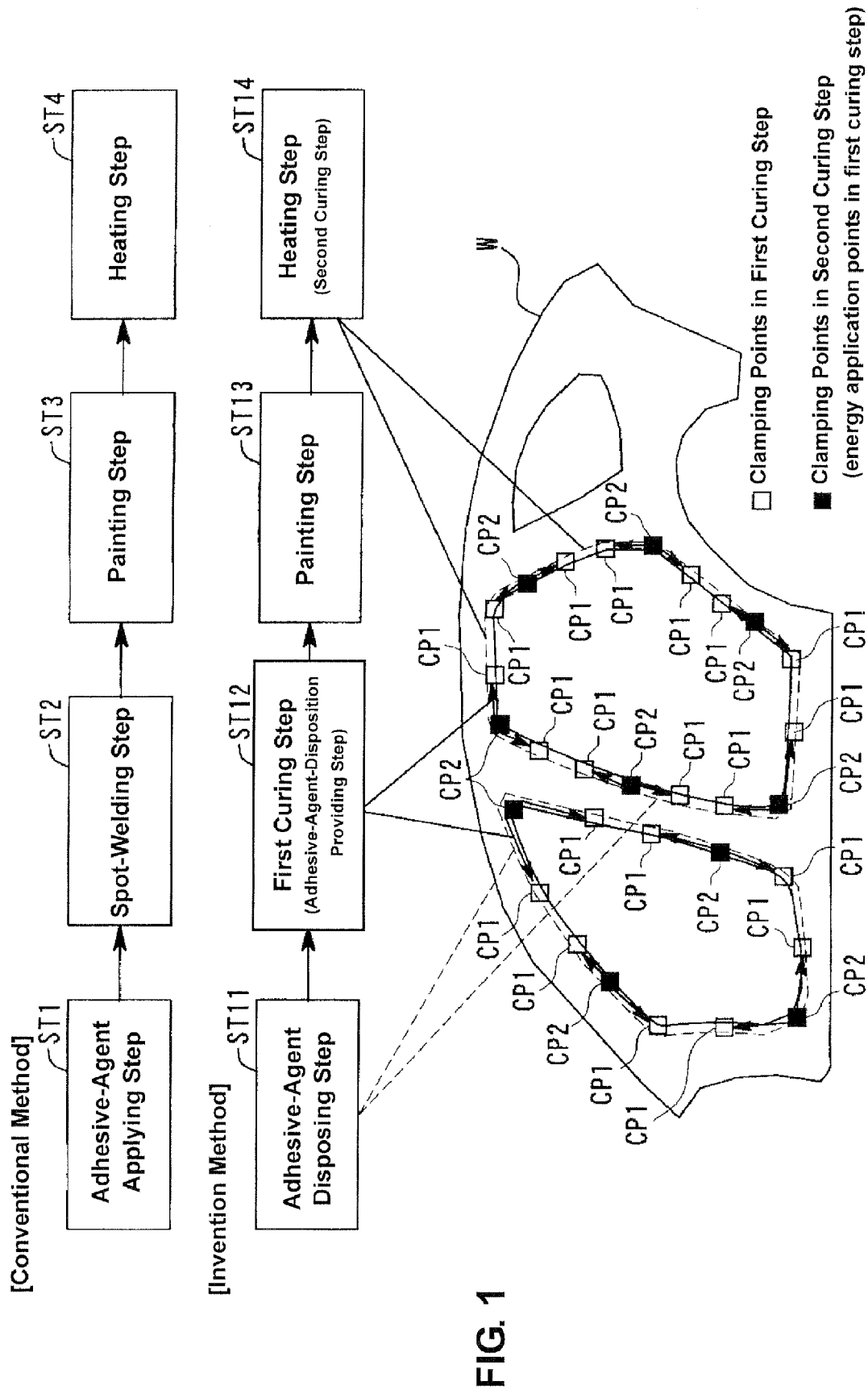
FIG. 1 is a step diagram explaining a concept of a first embodiment of the present invention.

Hereinafter, preferred embodiments of the present invention will be described referring to the accompanying drawings. Hereinafter, substantially the same members are denoted by the same reference characters in the embodiments, and duplicated descriptions are omitted here.

Embodiment 1

FIG. 1 is a step diagram explaining a concept of a first embodiment of the present invention.

At first, a conventional method (the weld bond method) will be explained referring to FIG. 1. This conventional method comprises an adhesive-agent applying step ST1 in which an adhesive agent is applied on a work, a spot-welding step ST2 in which a spot welding is conducted to the work with the adhesive agent applied thereon, a painting step ST3 in which the work is painted, and a heating step ST4 in which a heating treatment is applied in a drying device.

In this conventional method, in a case where the above-describe adhesive agent having the chain-reacting curing reaction function is applied as an adhesive agent that is used in the adhesive-agent applying step ST1, this adhesive agent may be easily influenced by various differences in strength of an energy inputted at the spot welding, in a welding term, in thermal circumferences of welding spots, and the like in the spot-welding step ST2. As a result, an insufficient curing could occur locally at the adhesive agent in the spot-welding step ST2, thereby deteriorating the joining quality of the works W.

Then, according to the first embodiment of the present invention, there is provided a joining method that comprises an adhesive-agent disposing step ST11 of disposing the adhesive agent, a first curing step ST12 of curing part of the adhesive agent disposed (including an adhesive-agent-disposition providing step of the present invention), a painting step ST13 of coating a paint on the works W, and a heating step (a second curing step) ST14 of applying a heating treatment with a drying device.

Now, the works W will be described.

Figure 2A:
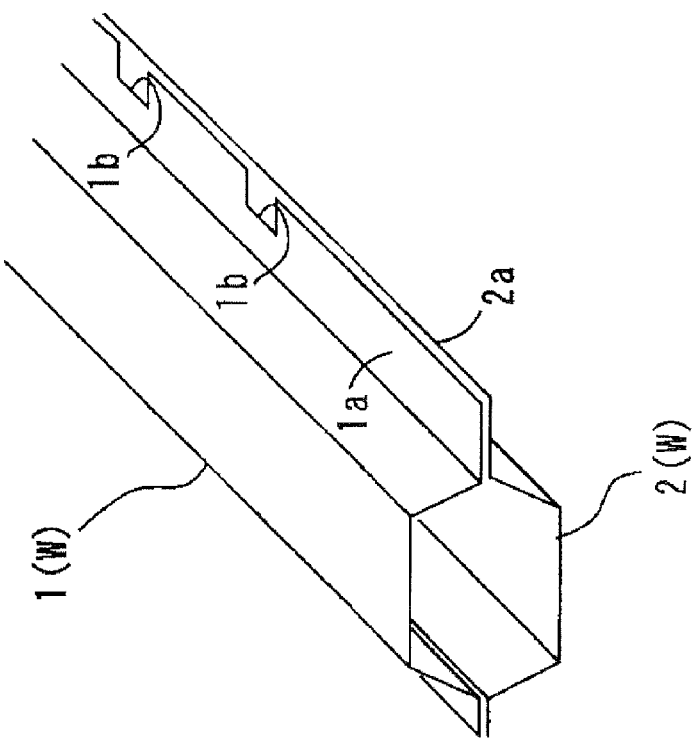
FIGS. 2A, 2B are perspective views of exemplified works according to the first embodiment.
Figure 2B:
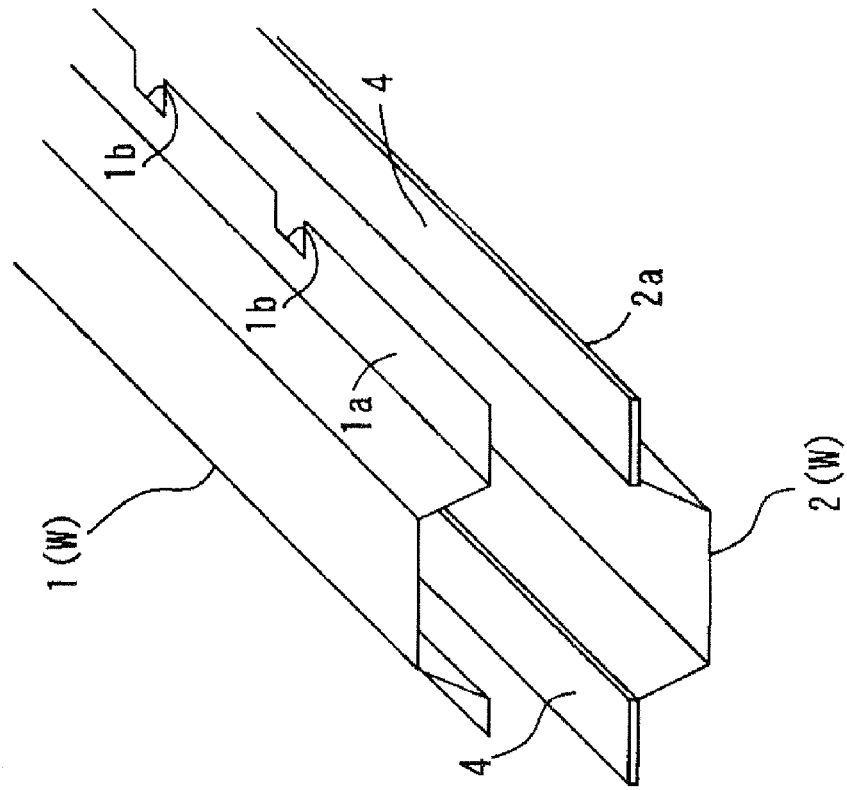
Figure 4:
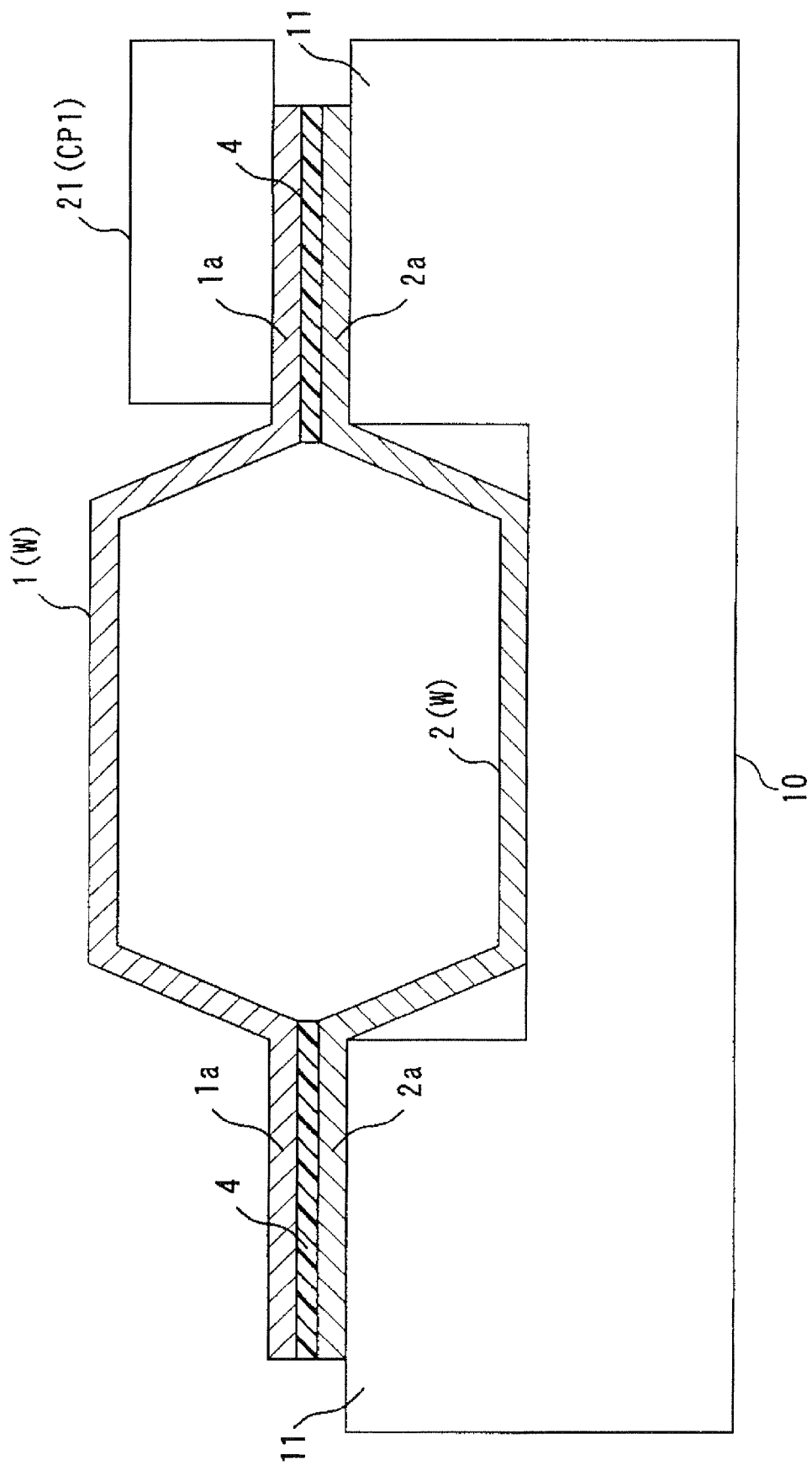
FIG. 4 is a sectional view of the works at clamping according to the first embodiment.

FIGS. 2A, 2B are perspective views of exemplified works according to the first embodiment, FIG. 2A is an exploded diagram; FIG. 2B is an assembling diagram. FIG. 3 is a side view of the works at clamping according to the first embodiment. FIG. 4 is a sectional view of the works at clamping according to the first embodiment.

The works W shown in FIG. 1, for example, are comprised of panels of an automotive vehicle, such as a center pillar inner panel 1 or the like and a side frame outer panel 2, which are assembled together to form an side frame assembly of a vehicle body as shown in FIGS. 2A, 2B-4. The works W of the side frame assembly further comprise a reinforcement and an inner panel that are joined, in addition to the center pillar inner panel 1 and the side frame outer panel 2, which are just shown briefly in FIG. 2.

A portion of the works W that forms the center pillar (so-called B pillar) includes the center pillar inner panel 1 and the side frame outer panel 2, which have a U-shaped cross section and include flanges 1a, 2a at their both-side ends respectively as shown in FIG. 2. An adhesive agent having the chain-reacting curing reaction function 4 is disposed between the flanges 1a, 2a. Both flanges 1a, 2a are joined together with this adhesive agent 4, so that the center pillar inner panel 1 and the side frame outer panel 2 are assembled integrally as a unit.

The adhesive agent 4 is a resin composition that primarily comprises a photopolymerizable resin (mainly, epoxy resin, and preferably alicyclic epoxy resin), a photo- and thermopolymerization initiator (e.g., aromatic sulfonium salt), and a photopolymerization initiator (e.g., sulfonium salt). Herein, when this adhesive agent is exposed to energy radiation, such as ultraviolet radiation, electron beam, X-rays, infrared radiation, sunlight, visible light, laser beam (e.g., excimer laser, $CO_2$ laser), radiated heat rays, and other energy such as heat, a cation and a heat of curing reaction are positively generated within the resin composition of the adhesive agent, so that the resin composition of the adhesive agent is cured by means of the reaction heat energies and the cation like a chain reaction. The application thickness of the adhesive agent 4 is preferably 0.01-10 mm, and the application width is preferably 1.0-30 mm. The curing conditions of the adhesive agent 4 is to radiate energy beams that can give an energy equivalent to a heat of 100 degrees centigrade or greater.

As shown in FIGS. 2A and 2B, some openings 1b are formed at the flange 1a of the center pillar inner panel 1 along its longitudinal direction. The adhesive agent 4 is exposed at these openings 1b when the center pillar inner panel 1 and the side frame outer panel 2 are joined together. And, the adhesive agent 4 is exposed to the ultraviolet rays that is to be radiated for applying a trigger energy in order to cause the chain reaction thereat as shown in FIG. 3. Each opening 1b is located at a clamping point in the second curing step, which is denoted by CP2 in FIG. 1.

Next, the respective steps shown in FIG. 1 will be described.

In the adhesive-agent disposing step ST11, the adhesive agent having the chain-reacting curing reaction function 4 is disposed on either flange 1a (2a) of the center pillar inner panel 1 and the side frame outer panel 2 through coating or another applying method.

Herein, the adhesive agent 4 disposed in the adhesive-agent disposing step ST11 is not cured at once, but part of the adhesive agent 4 is cured first in the first curing step ST12, which will be described below, and then the rest part of the adhesive agent 4 is cured in the heating step (second curing step) ST14. In the present embodiment, there are provided a first curing portion and a second curing portion at the center pillar inner panel 1 and the side frame outer panel 2 as works where the above-described respective parts of the adhesive agent 4 are disposed respectively so that the respective parts of the adhesive agent 4 to be cured in the first curing step ST12 and the heating step ST14 can be separated from each other.

Herein, the above-described first curing portion is where the adhesive agent 4 is cured by the trigger energy applied in the first curing step ST12. The first curing portion is comprised of plural portions, which are located at many spread joining portions of the center pillar inner panel 1 and the side frame outer panel 2, so that any improper deformation of works due to local curing shrinkages of adhesive agent or the like can be prevented. In an example shown in FIG. 1, the first curing portion is an area between the clamping points CP1, CP2.

Meanwhile, the second curing portion is where the adhesive agent 4 is cured by heating in the heating step ST14, and this portion is located near the above-described first curing portion. In the example shown in FIG. 1, the second curing portion is an area between the clamping points CP1, CP1.

Figure 6A:
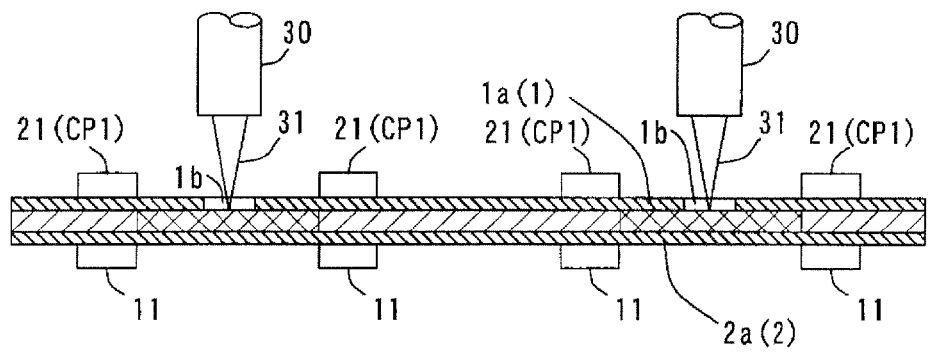
FIGS. 6A, 6B show an energy applying step according to the first embodiment.

According to the present embodiment, two clamping points CP1 for clamping the works W in the first curing step are provided between the clamping points CP2, CP2 for clamping the work W in the second curing step, for example (see FIGS. 1 and 6A). Thus, there is provided an adhesive-agent-disposition providing step of providing the disposition of the adhesive agent 4 in such a manner that part of the adhesive agent 4 disposed at the first curing portion and another part of the adhesive agent 4 disposed at the second curing portion are in thermal isolation so that the chain-reacting curing reaction of the part of the adhesive agent at the first curing portion can be restrained from transferring to the another part of the adhesive agent at the second curing portion. Further, since the two clamping points CP1, CP1 of the first curing step are provided between the clamping points CP2, CP2 of the second curing step, the length of the first curing portion can be made shorter properly, thereby preventing the improper deformation of works due to local curing shrinkages of adhesive agent effectively.

The first curing step ST11 includes a clamping step in which the center pillar inner panel 1 is placed on the side frame outer panel 2 provided on a base 10 shown in FIGS. 3, 4, 5A and 5B, and these panels 1, 2 are clamped with a number of toggle-type clamps 21 for the first curing step. In this clamping step, both the clamping function of the works W and the restraint function of the curing-reaction transferring in the above-described adhesive-agent-disposition providing step are conducted at least with the clamps 21.

Figure 6B:
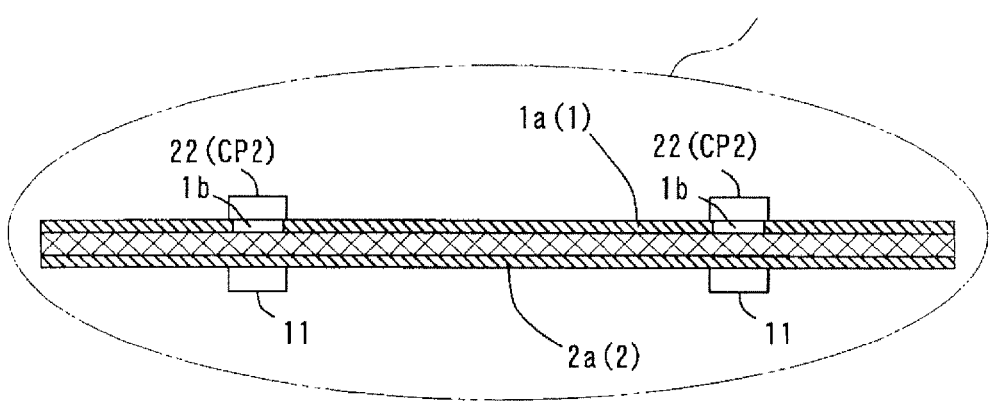

FIGS. 5A, 5B are perspective views showing manners of the clamping step of the works according to the first embodiment, FIG. 5A shows the manner in the first curing step; FIG. 5B shows the manner in the second curing step. FIGS. 6A, 6B show an energy applying step according to the first embodiment, FIG. 6A shows a manner in the first curing step; FIG. 6B shows a manner in the second curing step.

The base 10 has a plurality of projections 11 to support the flange 2a of the side frame outer panel 2. The projections 11 are disposed at plural portions in a dotty shape so as to correspond to the clamping points CP1 for the first curing step as shown in FIG. 1. Thus, the side frame outer panel 2 is placed on the base 10 in a state in which the second curing portion containing the clamping points CP2 shown in FIG. 1 is open.

The clamps 21 for the first curing step are configured to be movable between its clamping position shown in FIG. 5A and its retreated open position shown in FIG. 5B by rotating a metal pressing member, not illustrated, that has a thermal conductivity with a rotation of a toggle mechanism, not illustrated. In the clamping position, the clamps 21 clamp the both flanges 1a, 2a with the projections 11 of the base 10 at the clamping points CP1 shown in FIG. 1, thereby fixing the center pillar inner panel 1 to the side frame outer panel 2. As a result, the second curing portion containing the clamping points CP2 shown in FIG. 1 remains in the open state, and the adhesive agent 4 located at the openings 1b shown in FIG. 1 also remains in the exposed state.

In this state, the first curing step is executed by applying ultraviolet rays 31 to the adhesive agent 4 through the openings 1b from outside the center pillar inner panel 1 with a well-known ultraviolet-rays-radiation device 30 as shown FIG. 3. Application of the ultraviolet rays 31 causes starting of curing the adhesive agent exposed at the openings 1b, generating cation and a heat of curing reaction. Herein, the heat of curing reaction may transfer in a direction shown by an arrow from the clamping points CP2 for the second curing step shown in FIG. 1 where the ultraviolet rays 31 are applied. However, each clamping point CP2 of the flanges 1a, 2a is clamped with the clamp 21 for the first curing step in the first curing step, so that the transferring heat can be let go away to an outside portion via both the clamp 21 and the projection 11 of the base 10. As a result, the culling reaction of the adhesive agent 4 at the clamping points CP1 can stop here. Thereby, the stop of curing reaction of the adhesive agent 4 can be made positively. Accordingly, local curing shrinkages of adhesive agent 4 can be restrained properly, thereby preventing any improper deformation of the work W or opening of the joining face.

Then, in the paining step ST13 shown in FIG. 1, a well-known electrodeposition painting is applied to the surface of the works W.

In the subsequent heating step ST14 in FIG. 1, the works W are heated at a specified heading condition (e.g., for 20 minutes with a temperature of 150 degrees centigrade) in a well-known paint drying device as a heating device (not illustrated). Herein, the works W are placed and fixed on the base 10 shown in FIG. 5A with the clamps 22 for the second curing step. These clamps 22 are for pressing the works W against the clamping points CP2 of the second curing step shown in FIG. 1. Herein, part of the adhesive agent 4 that has not been cured yet (i.e., whose curing reaction has not occurred yet) in the first curing step comes to be substantially open in the paint drying device. Accordingly, all part of the adhesive agent 4 can be surely cured here by heating the works W at the above-described heading condition. As a result, the center pillar inner panel 1 and the side frame outer panel 2 can be joined firmly.

As described above, according to the present embodiment, there are provided the adhesive-agent-disposition providing step of providing disposition of the adhesive agent 4 in such a manner that part of the adhesive agent 4 that is disposed at the first curing portion and another part of the adhesive agent 4 that is disposed at the second curing portion are in thermal isolation so that the chain-reacting curing reaction of the part of the adhesive agent 4 at the first curing portion can be restrained from transferring to the another part of the adhesive agent 4 at the second curing portion, the first curing step ST12 of curing the part of the adhesive agent 4 at the first curing portion by applying the ultraviolet rays 31 to the another part of the adhesive agent at the first curing portion, and the heating step ST14 as the second curing step of curing the another part of the adhesive agent 4 at the second curing portion. Thereby, the adhesive agent 4 at the first curing portion can be cured stably and surely with the chain-reacting curing reaction caused by the ultraviolet rays 31 in the first curing step ST12. And, the adhesive agent 4 at the second curing portion can be cured surely and properly through the succeeding heating step ST14. Accordingly, any improper lack of joining strength, deformation of works W with local curing shrinkages of adhesive agent, opening of joining face, and the like can be properly prevented, thereby ensuring the properly high joining quality and productivity of the work W.

Further, in the present embodiment, the adhesive-agent-disposition providing step comprises the step of letting the curing-reaction heat go away to the outside portion, whereby the chain-reacting curing reaction of the part of the adhesive agent 4 at the first curing portion can be restrained from transferring to the another part of the adhesive agent 4 at the second curing portion. Thereby, the above-described function and advantage of the embodiment can be achieved properly.

More specifically, this beat-letting-going-away step comprises the clamping step of clamping the clamping points CP1 of the works W with the clamps 21 for the first curing step ST12 that has the thermal conductivity. Thereby, since the heat generated by the chain-reacting curing reaction of the part of the adhesive agent 4 at the first curing portion is let go away smoothly to the outside portion via both the clamps 21 and the projections 11 of the base 10, the chain-reacting curing reaction can be restrained from transferring to the another part of the adhesive agent 4 at the second curing portion. As a result, the adhesive agent 4 at the second curing portion can remain properly in the state in which it has not been cured yet. Thus, the adhesive agent 4 at the second curing portion can be cured surely and properly through the succeeding heating step ST14. Further, the above-described transferring restraint function of the chain-reacting curing reaction can be achieved easily by a very simple way of clamping the works W with the clamps 21.

Also, the second curing step is executed by the heating step ST14 in which the works W are heated in the paint drying device as the heater (heating device) so as to cure the adhesive agent 4 at the area located between the clamping points 21 for the first curing step, as shown in FIG. 6B. Thereby, the second curing step can be materialized easily, thereby easily and surely curing the adhesive agent remaining in the state in which it has not been cured yet.

Further, the second curing step is executed by the heating step ST14, in which the paint coated on the works W is dried after the painting step ST13 of the works W. Thereby, since the second curing step is executed by the beating step ST14, there may be no need to provide any additional step or facility for the second curing step, thereby further improving productivity.

Embodiment 2

Figure 7A:
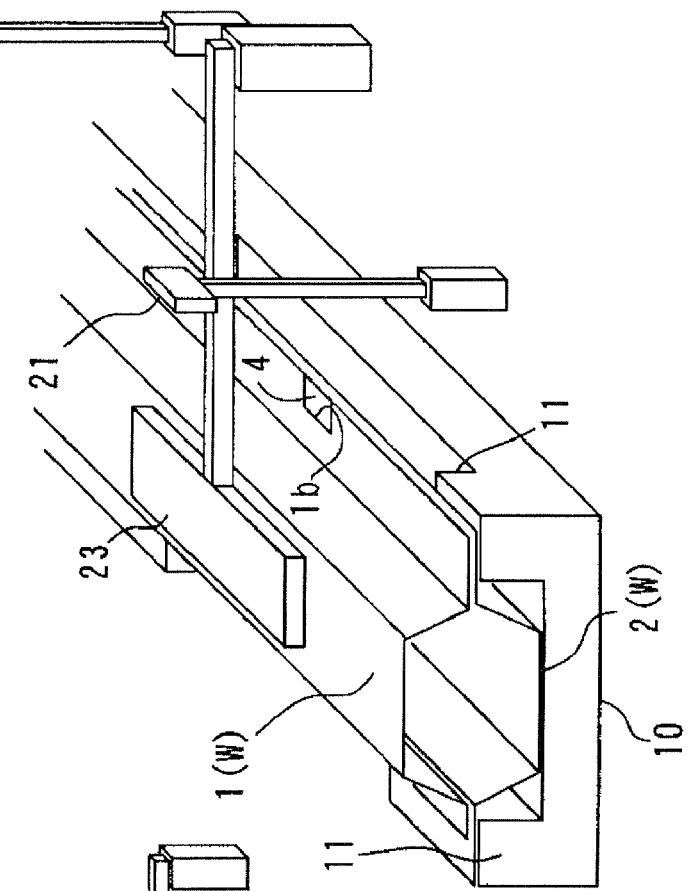
FIGS. 7A, 7B are perspective views showing manners of a clamping step of the works according to a second embodiment of the present invention.
Figure 7B:
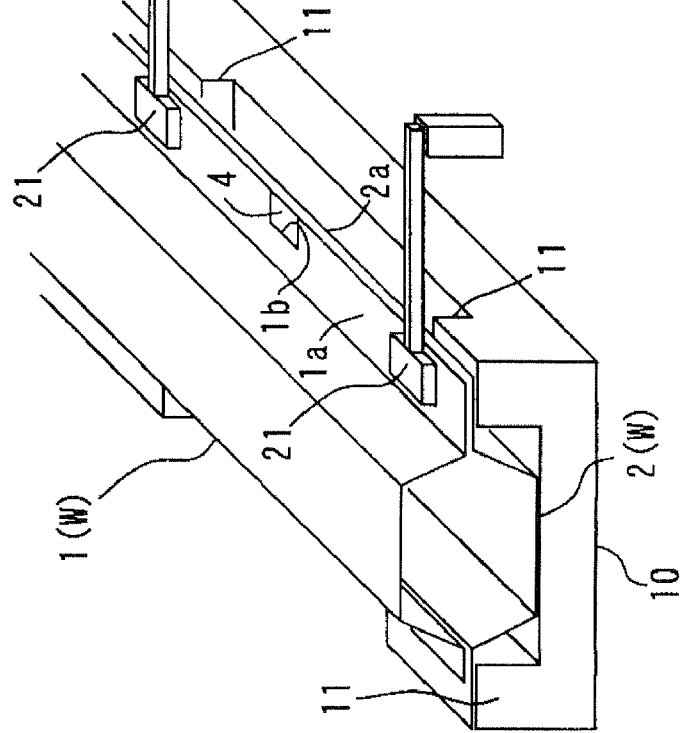

FIGS. 7A, 7B are perspective views showing manners of a clamping step of the works according to a second embodiment of the present invention, FIG. 7A shows the manner in a first curing step; FIG. 7B shows the manner in a second curing step.

For example, as shown in FIG. 7B, another manner of clamping the works W in the second curing step may be configured such that the works W are clamped with a clamp 23 for the heating step with both clamping points CP1, CP2 shown in FIG. 1. The clamp 23 for the heating step is a toggle type of clamp operative to press a central portion of the pillar work 1 (W) against the base 10.

FIG. 8 is an explanatory diagram showing a manner of applying the ultraviolet rays 31. It may be preferable that the ultraviolet rays 31 from the ultraviolet-rays-radiation device 30 be radiated condensedly as shown in FIGS. 3, 6A. However, in a case where a span of area for the first curing and plural openings 1b are formed within this span as shown in FIG. 8, the ultraviolet rays 31 in a slit shape may be radiated scanning the plural openings 1b at one time so that a stable, quick curing can be obtained.

Embodiment 3

Figure 9A:
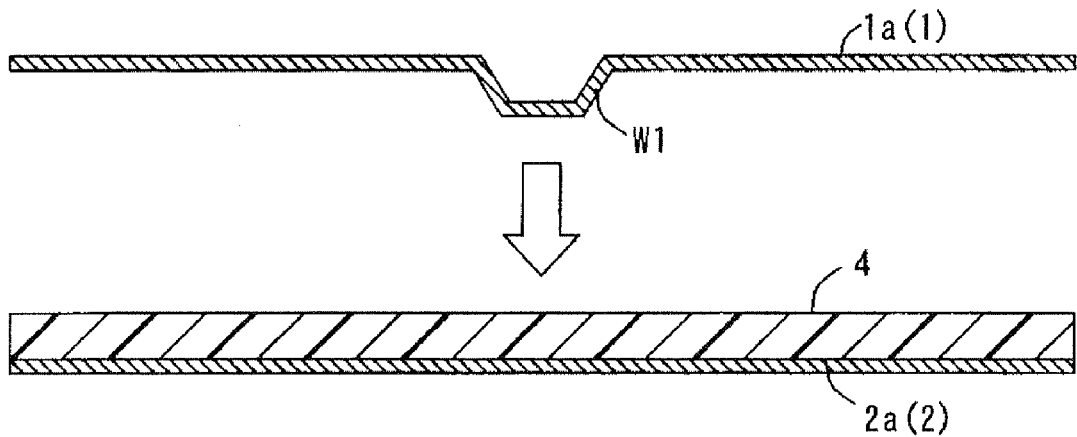
FIGS. 9A, 9B, 9C are schematic sectional views showing an adhesive-agent disposing step according to a third embodiment of the present invention.
Figure 9B:
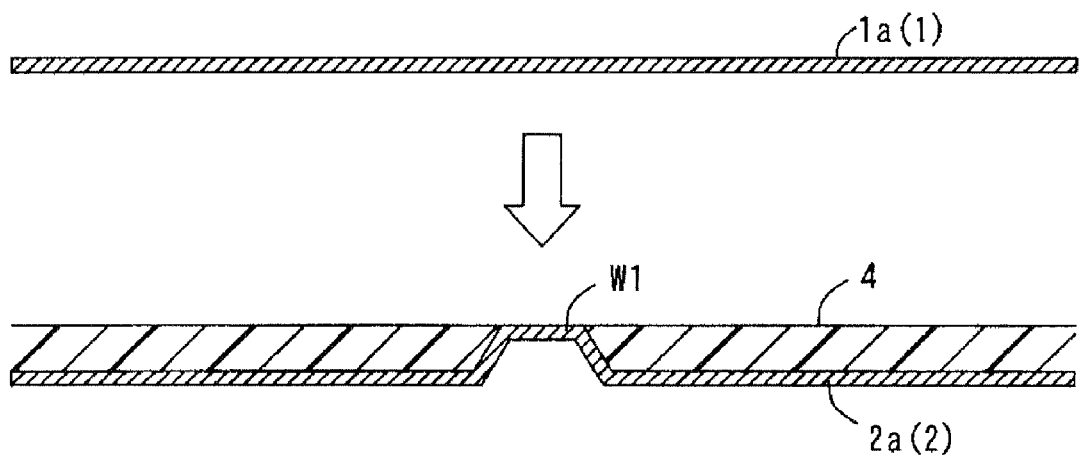
Figure 9C:
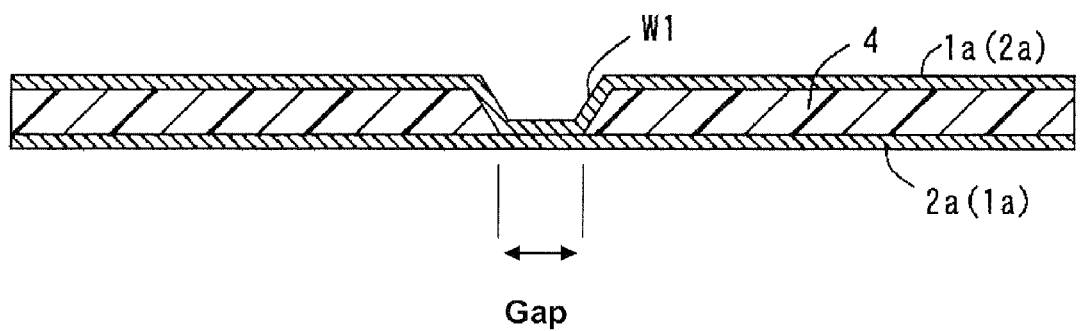

A step of providing a gap, which has substantially no adhesive agent, between the part of the adhesive agent at the first curing portion and another part of the adhesive agent at the second curing portion may be applied as the adhesive-agent-disposition providing step of the present invention. And, according to a third embodiment, the above-described gap is provided by forming a projection portion at a specified portion of at least one of the works that forms the joining face, the projection portion being formed so as to project toward the other of the works in a forming step of the works. FIGS. 9A, 9B, 9C are schematic sectional views showing an adhesive-agent disposing step according to this third embodiment of the present invention.

Specifically, a projection portion WI is formed at either the center pillar inner 1 (see FIG. 9A) or the side frame outer panel 2 (see FIG. 9B) or both of these panels 1, 2 so as to project toward the other. The projection portion W1 may be made by a well-known pressing. Any shape of the projection portion W1 may be applied, such as a circular, oval, or slit shape. The projection portion W1 is disposed at the clamping points CP1 shown in FIG. 1. The first curing portion and the second curing portion are provided (partitioned) at the center pillar inner 1 and the side frame outer panel 2 by the projection portion W1. The adhesive agent 4 is disposed (applied) at either the center pillar inner 1 or the side frame outer panel 2 in the adhesive-agent disposing step ST11, thereby the both panels 1, 2 are joined together to form their assembly shown in FIG. 9C.

In a manner shown in FIG. 9A, the adhesive agent 4 is disposed at the work (side frame outer panel 2) with no projection portion, and then the other work (center pillar inner panel 1) with the projection portion W1 is joined. Thereby, the adhesive agent 4 is separated by the projection portion W1 as shown in FIG. 9C. In a manner shown in FIG. 9B, meanwhile, the adhesive agent 4 is disposed at the work (side frame outer panel 2) with the projection portion W1, and then the other work (center pillar inner panel 1) with no projection portion is joined. Thereby, the adhesive agent 4 is separated by the projection portion W1 as shown in FIG. 9C.

Thus, the first curing portion and the second curing portion are provided (partitioned) at the center pillar inner 1 and the side frame outer panel 2 by the projection portion W1. As a result, the chain-reacting curing reaction of the part of the adhesive agent 4 at the first curing portion can be restrained from transferring to the another part of the adhesive agent 4 at the second curing portion with the gap with substantially no adhesive agent that is formed by the projection portion W1.

Embodiment 4

Figure 10:
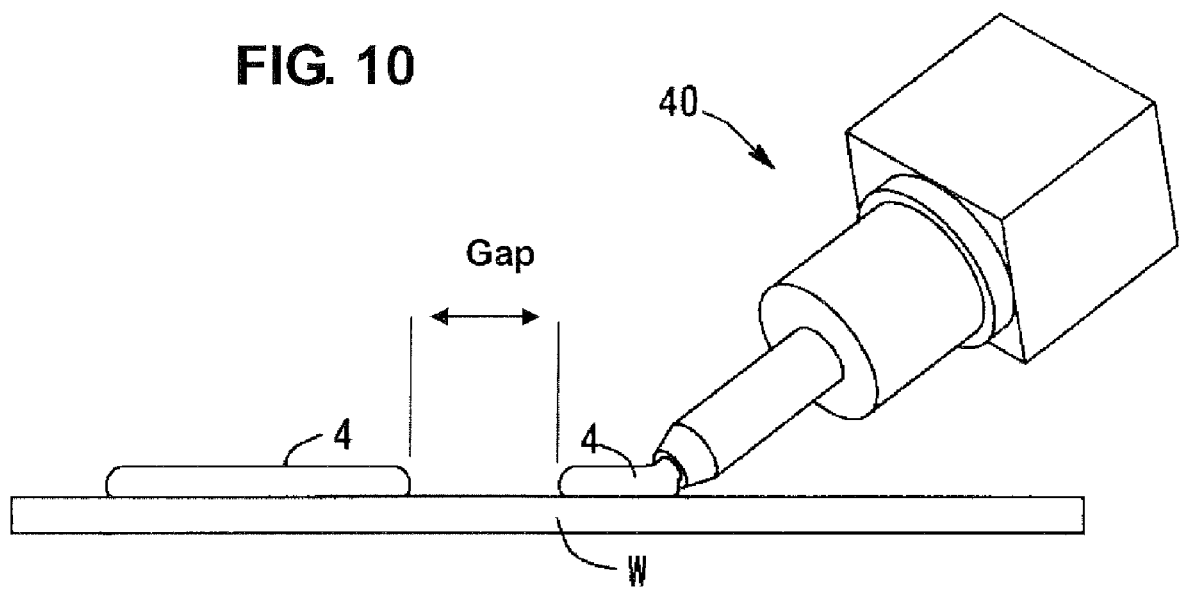
FIG. 10 is an explanatory diagram according to a fourth embodiment of the present invention.

The above-described gap may be provided by applying the adhesive agent to a specified portion of at least one of the works that forms the joining face in an adhesive-agent applying step in such a manner applying of the adhesive agent is stop temporally. FIG. 10 is an explanatory diagram according to a fourth embodiment of the present invention.

Specifically, in the adhesive-agent applying step, an adhesive-agent applying nozzle 40 to inject the liquid type of adhesive agent 4 is provided at an adhesive-agent supply system, not illustrated, and the adhesive-agent supply system is controlled such that applying of the adhesive agent 4 from the adhesive-agent applying nozzle 40 is stop temporally. Thereby, there is provided the gap with substantially no adhesive agent. This gap is formed at a portion that corresponds to the clamping points CP1 shown in FIG. 1. Thus, since there is the portion where no adhesive agent exists in the embodiment shown in FIG. 10, the curing-reaction heat generated at part of the adhesive agent 4 can be restrained from transferring to another part of the adhesive agent 4 beyond this gap with no adhesive agent.

The present invention should not be limited to the above-described embodiments, but any other modifications and improvements may be applied within the scope of a sprit of the present invention.

For example, a pair of works W is not limited to two members of the center pillar inner panel 1 and the side frame outer panel 2, but three or more members may be applied. Further, although the adhesive agent 4 is preferably disposed in a line shape as the above-described embodiments, the adhesive agent may be disposed in a face shape. Herein, the line shape may contain a straight-line shape, a curve-line shape, a circular-line shape, or the like. Further, the adhesive agent may be disposed at plural portions in a dotty shape, in which part of the adhesive agent 4 dotted is cured in the first curing step, and the rest of part is cured in the second curing step. Also, embodiments of "disposition of the adhesive agent 4" may include applying of a solid type of adhesive agent 4, applying or filling of a liquid type of adhesive agent 4, and the like. Further, in a case where the paint during device is used in the second curing step as the first embodiment, the clamps 21 for the first curing step that has fixed the works W in the first curing step may be also used in its clamping state in the second curing step.

What is claimed is:

1. A joining method of works, in which a pair of works are joined with an adhesive agent having a chain-reacting curing reaction function disposed at a joining face of the works, comprising:

an adhesive-agent-disposition providing step providing the adhesive agent such that a part of the adhesive agent is disposed at a first curing portion of the joining face, and another part of the adhesive agent is disposed at a second curing portion of the joining face near the first curing portion, wherein the first curing portion and the second curing portion are in thermal isolation from each other so that a chain-reacting curing reaction of the adhesive agent at the first curing portion is restrained from transferring to the adhesive agent at the second curing portion;

the adhesive-agent-disposition providing step comprising providing a gap, which has substantially no adhesive agent, between the adhesive agent at the first curing portion and the adhesive agent at the second curing portion, wherein said gap is provided by forming a projection portion at a specified portion of at least one of the works that forms the joining face, the projection portion being formed so as to project toward the other of the works in a forming step of the works;

a first curing step of curing the adhesive agent at the first curing portion by applying an energy to cause the chain-reacting curing reaction to the adhesive agent at the first curing portion; and a second curing step of curing the adhesive agent at the second curing portion, the second curing step being conducted after the first curing step;

wherein said second curing step is executed by a heating step, in which the works are heated in a heater, after the first curing step.

2. The joining method of works of claim 1, wherein said adhesive-agent-disposition providing step comprises a step of drawing heat generated by the chain-reacting curing reaction of the part of the adhesive agent at the first curing portion to an outside portion.

3. The joining method of works of claim 2, wherein said step of drawing heat to an outside portion comprises clamping a specified portion of the work located at a terminal portion of the second curing portion with a clamp having a thermal conductivity.

4. The joining method of works of claim 1, wherein the chain-reacting curing reaction of the adhesive agent at the first curing portion is restrained from transferring to the adhesive agent at the second curing portion with said gap.

5. The joining method of works of claim 1, wherein said second curing step is executed by a heating step, in which a paint coated on the works is dried, after a painting step.

6. The joining method of works of claim 5, wherein said painting step is an electrodeposition painting step.

7. The joining method of works of claim 1, wherein said works comprise a vehicle body of an automotive vehicle.

* * * * *